(12) United States Patent
Riot et al.

(10) Patent No.: US 11,885,372 B2
(45) Date of Patent: Jan. 30, 2024

(54) FRICTION-LESS LOW-PROFILE HINGE SYSTEM AND METHOD

(71) Applicant: Lawrence Livermore National Security, LLC, Livermore, CA (US)

(72) Inventors: Vincent Riot, Oakland, CA (US); Darrell Carter, Livermore, CA (US); Todd Alan Decker, Grants Pass, OR (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 867 days.

(21) Appl. No.: 16/927,235

(22) Filed: Jul. 13, 2020

(65) Prior Publication Data

US 2022/0010833 A1    Jan. 13, 2022

(51) Int. Cl.
| | | |
|---|---|---|
| F16C 11/12 | (2006.01) | |
| F03G 7/06 | (2006.01) | |
| B64G 1/44 | (2006.01) | |

(52) U.S. Cl.
CPC .............. *F16C 11/12* (2013.01); *F03G 7/065* (2013.01); *B64G 1/443* (2013.01); *F16C 2202/28* (2013.01); *F16C 2204/42* (2013.01); *F16C 2204/52* (2013.01); *F16C 2226/00* (2013.01); *F16C 2226/60* (2013.01); *F16C 2229/00* (2013.01); *F16C 2240/70* (2013.01); *F16C 2326/47* (2013.01)

(58) Field of Classification Search
CPC .. F16C 11/12; F16C 2202/28; F16C 2204/42; F16C 2204/52; F16C 2226/00; F16C 2226/60; F16C 2229/00; F16C 2240/70; F16C 2326/47; F03G 7/0614; F03G 7/06143; B64G 1/443; B64G 1/222; E05D 7/009; E05D 5/10
USPC ........................... 16/223, 225, 273, 308, 373
See application file for complete search history.

(56) References Cited

U.S. PATENT DOCUMENTS

| | | | |
|---|---|---|---|
| 6,888,513 B1* | 5/2005 | Graham | B64G 1/222 |
| | | | 343/880 |
| 10,370,126 B1* | 8/2019 | Harvey | B64G 1/222 |
| 10,773,833 B1* | 9/2020 | Harvey | H02S 30/10 |
| 2005/0198777 A1* | 9/2005 | Mabe | E05D 5/10 |
| | | | 16/308 |

(Continued)

FOREIGN PATENT DOCUMENTS

| | | | |
|---|---|---|---|
| JP | H051698 U | * | 1/1993 |
| JP | 2019536930 A | * | 12/2019 |

*Primary Examiner* — William L Miller
(74) *Attorney, Agent, or Firm* — HARNESS, DICKEY & PIERCE, P.L.C.

(57) ABSTRACT

The present disclosure relates to a reduced friction torsion component system that makes use of a first frame portion adapted to be coupled to, or integrally formed with, a first object, and forming a first bore, and a second frame portion adapted to be coupled to, or integrally formed with, a second object, and forming a second bore. The two bores are axially aligned and receive at least one elongated hinge component. The elongated hinge component operates to both couple the first and second frame portions together for pivoting movement relative to one another, and also provides a torsional biasing force to enable pivotal deployment from a first position to a second position of one of the first or second frame portions.

21 Claims, 5 Drawing Sheets

(56) References Cited

U.S. PATENT DOCUMENTS

| | | | |
|---|---|---|---|
| 2011/0210209 A1* | 9/2011 | Taylor | B64G 1/443 |
| | | | 244/172.6 |
| 2014/0042275 A1* | 2/2014 | Abrams | B64G 1/407 |
| | | | 244/172.6 |
| 2017/0113817 A1* | 4/2017 | Koehler | F03G 7/065 |
| 2017/0175806 A1* | 6/2017 | Meurer | H02S 30/20 |
| 2020/0108951 A1* | 4/2020 | Cahoy | E05C 3/02 |
| 2022/0073217 A1* | 3/2022 | Iverson | B64G 1/503 |
| 2022/0388694 A1* | 12/2022 | Barnes | G02B 7/183 |

\* cited by examiner

FRICTION-LESS LOW-PROFILE HINGE SYSTEM AND METHOD

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD

The present disclosure relates to hinges, and more particularly to a friction-less hinge that makes use of a pre-loaded, shape memory alloy wire to assist in deployment of a substructure coupled to the hinge, and where the hinge is especially well suited for deploying small scale solar panels from a spacecraft operating in the harsh conditions of space.

BACKGROUND

Cubesats are small satellites with highly constrained volume requirements. However, the increased complexity of CubeSats requires significant power to be harvested from the sun for maintaining operation. Current solar panel approaches for small satellites rely either on solar cells mounted directly onto the body of the spacecraft, or mounted to the body via hinges. Mounting directly onto the body is undesirable because it limits the surface area available for solar power collection, since the area of the solar panels is constrained by the surface area of the spacecraft.

Hinge based deployable solar panels are desirable because the surface area of the solar panels is not limited by the surface area of the spacecraft from which they are supported. As such, larger solar panels can be used which increases the surface area of each solar panel that can be exposed to the sun. However, one drawback with hinge mounted solar panels is that the hinges can suffer from cold welding and galling when deployed in space for periods of time. The cold welding and galling may cause failure of the hinge during deployment.

The following links are provided for examples of commercially available panels, which the reader may find helpful in understanding the subject matter and challenges associated with deployable solar panels: www.cubesatshop.com; www.clyde.space.com; and www.madesignllc.com.

It will also be appreciated that mechanical problems in early satellites were sometimes attributed to cold welding. In 2009 the European Space Agency published a peer reviewed paper detailing why cold welding is a significant issue that spacecraft designers need to carefully consider. The paper also cites a documented example from 1991 with the Galileo spacecraft high-gain antenna. One specific challenge with cold welding is that cold welding does not exclude relative motion between the surfaces that are to be joined. This allows the broadly defined notions of galling, fretting, sticking, stiction and adhesion to overlap in some instances. For example, it is possible for a joint to be the result of both cold (or "vacuum") welding and galling (and/or fretting and/or impact), Galling and cold welding, therefore, are not mutually exclusive.

Accordingly, a need still exists for a hinge which is well suited for use with solar panels and other substructures that may need to be deployed from a spacecraft while orbiting in space. There is a further need for a solar panel hinge which is robust and not susceptible to premature failure from cold welding or galling when exposed to the harsh conditions of space conditions.

SUMMARY

This section provides a general summary of the disclosure, and is not a comprehensive disclosure of its full scope or all of its features, and may not constitute prior art.

In one example implementation the present disclosure relates to a reduced friction torsion component hinge system. The hinge system may comprise a first frame portion adapted to be coupled to, or integrally formed with, a first object, and forming a first bore. A second frame portion may be included which is adapted to be coupled to, or integrally formed with, a second object, and which forms a second bore. The second bore is axially aligned with the first bore. The hinge system further may include at least one hinge component extending through the first and second bores for both coupling the first and second frame portions together for pivoting movement relative to one another, and for providing a torsional biasing force to enable pivotal deployment from a first position to a second position of one of the first or second frame portions.

In another aspect the present disclosure relates to a reduced friction, low profile torsion wire hinge system. The hinge system may include a first frame portion adapted to be coupled to, or integrally formed with, a first object, and forming a first bore. A second frame portion may be included which is adapted to be coupled to, or integrally formed with, a second object, and which forms a second bore. The second bore is axially aligned with the first bore. At least one elongated wire may be included which extends through the first and second bores for both coupling the first and second frame portions together for pivoting movement relative to one another, and for providing a torsional biasing force to enable pivotal deployment from a first position to a second position of one of the first or second frame portions. A mechanism may also be included for securing the elongated wire in a torsionally pre-loaded condition. This causes one of the first or second frame portions to be biased at least one of towards or away from the other.

In still another aspect the present disclosure relates to a method for forming a reduced friction torsion wire hinge. The method may comprise providing a first frame portion adapted to be coupled to, or integrally formed with, a first object, and forming a first bore. The method may further comprise providing a second frame portion adapted to be coupled to, or integrally formed with, a second object, and forming a second bore, with the second bore being axially aligned with the first bore. The method may further include inserting at least one elongated hinge component through the first and second bores to couple the first and second frame portions together for pivoting movement relative to one another, and further such that a first end of the hinge component engages with the first object. The method may further include applying a torsional pre-load force to the second end of the elongated hinge component and, while applying the pre-load force to the second end of the hinge component, restraining the second end in a pre-loaded angular orientation relative to the second object. This enables the elongated hinge component to bias the first and second frame portions, and thus the first and second objects, for rotational motion either toward one another or away from one another.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which.

DETAILED DESCRIPTION

Example embodiments will now be described more fully with reference to the accompanying drawings.

The present disclosure provides a low-profile hinge system which makes use of one or more shape memory alloy components, and which is especially well suited for use with any deployable substructure, and particularly with deployable solar panels used on spacecraft. The shape memory alloy components, which in one embodiment form one or more wires, operate with essentially no friction, and thus the hinge system effectively forms a substantially "friction-less" hinge. As such, the hinge of the present disclosure is not subject to cold welding or galling, which are concerns with hinges used in harsh environments, and especially in space applications with orbiting spacecraft.

The torsion of the shape memory alloy material used in the hinge system 10 provides the stored force for deployment of the panel and serves at the same time as the connecting element between the solar panel section and the hinge. The hinge system 10 of the present disclosure enables highly stiff solar panels, once the solar panels are deployed, which are able to maintain their flat, fully deployed orientation even when a large number of deployable solar panel sections are intercoupled together using a plurality of the hinge systems of the present disclosure.

Figure 1:
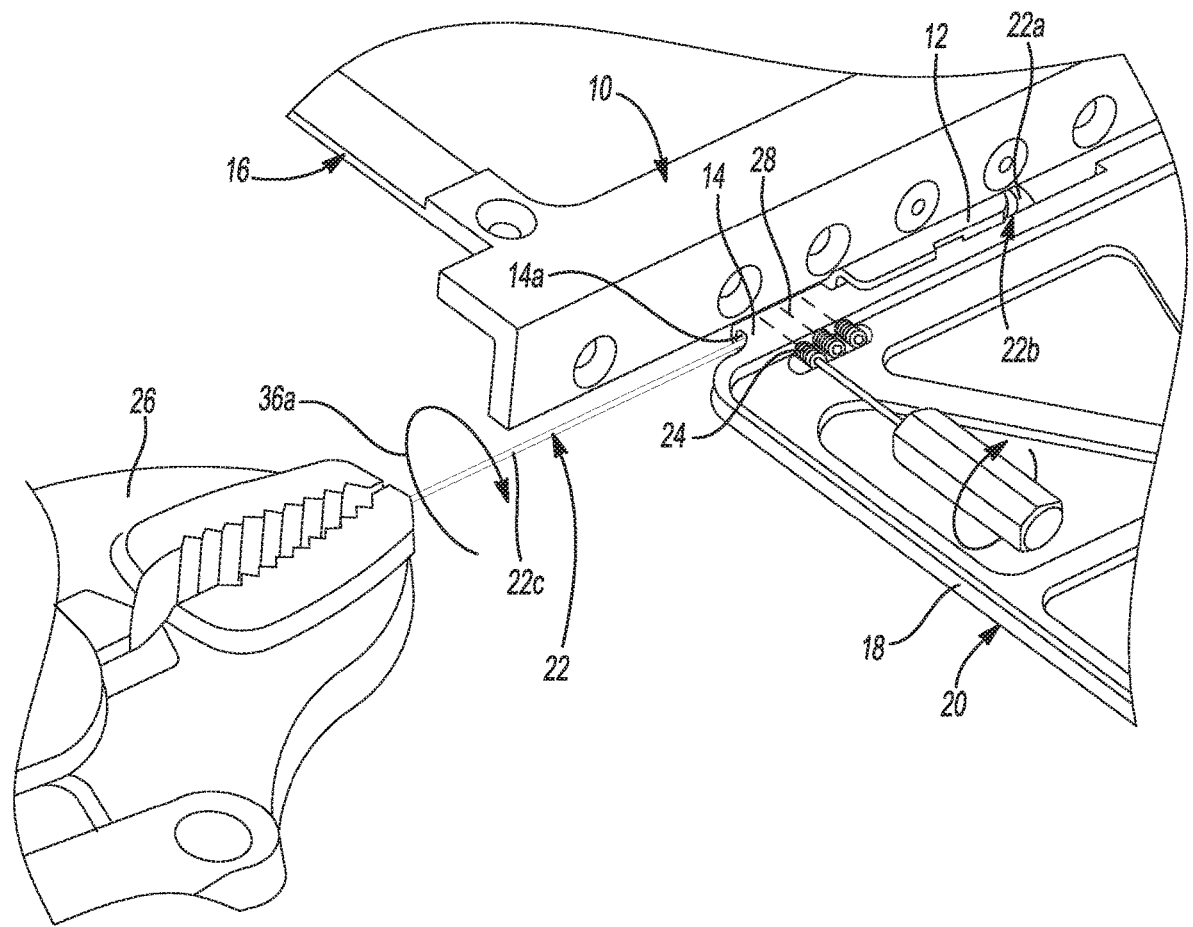
FIG. 1 is a perspective view of one embodiment of the hinge system of the present disclosure integrated for use on a spacecraft frame portion, and being used with a small, deployable solar panel.
Figure 2:
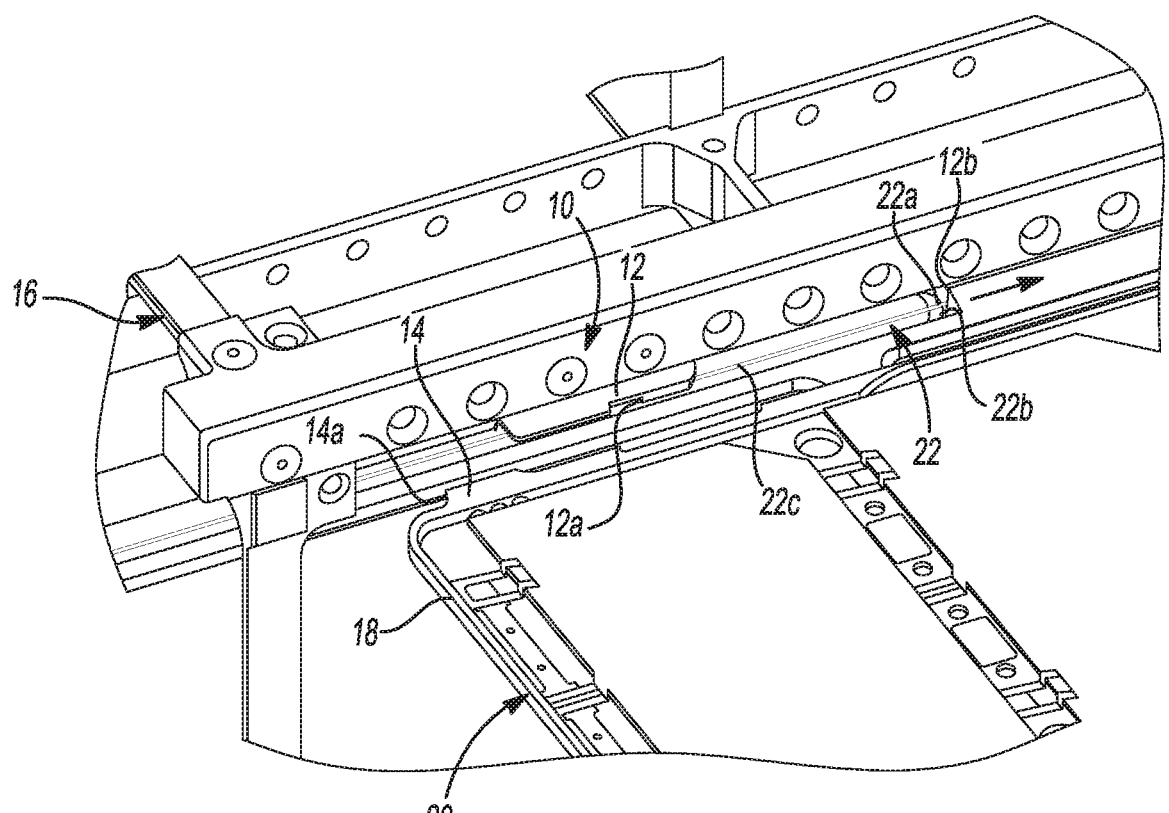
FIG. 2 is an exploded perspective view of the hinge of FIG. 1 showing the shape memory alloy hinge wire more clearly.

Referring to FIGS. 1 and 2, one embodiment of a hinge system 10 in accordance with the present disclosure is shown integrated for use on a spacecraft frame. For convenience, the hinge system 10 will be referred to throughout the following discussion simply as the "hinge 10". It will be appreciated immediately that the hinge 10 is not limited to use with only spacecraft, and instead can be used in a wide variety of other applications and with other objects or structures where it is necessary to deploy one or more objects or substructures between retracted or folded orientations, and deployed or extending orientations. It is expected that the hinge 10, however, will find significant utility in harsh environments, such as space, where cold welding and galling, over time, present significant challenges for conventional hinge structures.

The hinge 10 includes a first or fixed hinge portion 12 and a second or movable hinge portion 14. In this example the fixed hinge portion 12 is shown integrated onto a first object, which in this example is a structural frame portion 16 of a spacecraft. The movable hinge portion 14 is shown integrated onto a second object which in this example is a frame portion 18 of a solar panel 20. Implementations where the hinge portions 12 and 14 are integrally formed with portions of other components, such as shown in the figures, or where the hinge portions 12 and 14 form fully separate components and are attached with separate fasteners (i.e., threaded nuts and bolts, rivets or any other suitable fasteners), are also contemplated by the present disclosure.

The hinge 10 in this example further includes an elongated hinge component 22. In one implementation the elongated hinge component 22 is a wire, and in one specific form comprises an elongated shape memory alloy ("SMA") element, and in one specific implementation a SMA wire. Merely for convenience, the hinge component 22 will be referred to throughout the following discussion as the "SMA wire 22." However, it will be appreciated that while an SMA wire 22 is a particularly preferred implementation of the hinge component, elongated blade-like elements could be used as well. The specific material used need not be an SMA material, but could be stainless steel or any other material which can store torsional energy when twisted. An SMA wire, however, provides a degree of torsional energy storing ability which would require a significantly larger diameter in a stainless steel wire of the same length, and for space applications this weight and size reduction is especially advantageous.

In one form the SMA wire 22 may comprise a nickel titanium wire, generally known in the industry as "Nitinol", having a generally round cross-sectional shape. In one embodiment the cross-sectional diameter of the SMA component 22 may be in the range of about 0.020 inch-0.050 inch, and in one specific embodiment is about 0.020 inch in diameter. While an SMA rod (i.e., an element substantially larger in diameter than a "wire") may be used, for convenience the following discussion will reference the SMA component as the "SMA wire 22". The diameter the SMA wire 22 will be selected in large part on the application and the weight of the deployable element that the hinge 10 is being used to deploy. Larger deployable elements with a greater mass will typically necessitate the use of a larger diameter SMA wire 22, although for spacecraft applications (i.e., zero gravity environment), the mass/weight consideration may not be a significant factor in selecting the diameter of the SMA wire 22. Furthermore, the SMA wire 22 need not be perfectly round, but could be hexagonally, octagonally or pentagonally shaped in cross-section, or could comprise even different cross-sectional shapes.

In one implementation the SMA wire 22 has a length of about 1.0 inch (25.4 mm), although the precise length will be chosen on various factors including the components with which the hinge 10 is being used, and the amount of stored torsional biasing force that is needed for the application. It will be appreciated that the diameter of the SMA wire 22, its overall length, as well as its cross-sectional shape, are factors that will need to be taken into consideration in tailoring the hinge 10 for a given application requiring a particular torsional force to deploy or retract a component, and to provide the desired degree of stiffness of the deployed component.

In FIG. 1 the movable hinge portion 14 can be seen to include a bore 14a. In FIG. 2 the fixed hinge portion 12 is shown having a bore 12a. The bores 12a and 14a are sized to the diameter of the SMA wire 22 so as to be just slightly larger in diameter than the SMA wire, for example by a few thousands of an inch, and are axially aligned with one another. The structural frame portion 16 may include a blind hole 12b (FIG. 2) sized to capture a first end 22a of the SMA wire 22 during coupling of the two hinge portions 12 and 14 together during an assembly operation. In this regard the SMA wire 22 may incorporate a bend 22b at adjacent the first end 22a which configures the first end 22a to extend at an angle non-parallel to the remainder of the SMA wire, for example at a 90 degree angle. The bend 22b may be formed by cold-bending or any other suitable technique. The radius of the bend 22b may vary significantly depending on the overall dimensions of the hinge 10, but in one implementation is about 0.10 inch. It will be appreciated that the bores 12a and 14a also help to protect the SMA wire 22 during handling, and that the bend 22b is just one way of setting the pre-load of torsional energy. Set screws or even a suitable adhesive (e.g., epoxy) may potentially be used rather than the bend 22b to set and maintain the torsional energy pre-load force of the SMA wire 22.

It is a principal advantage of the hinge 10 that the SMA wire 22 serves both as a friction-less connection between the fixed and movable hinge portions 12 and 14, and as the biasing component that provides the biasing force to deploy the deployable element. The biasing ability of the SMA wire 22 is due to its ability to elastically return from a higher torsioned state to a lower torsioned state, that is, from a fully folded orientation of the solar panel 20, to a fully deployed orientation of the solar panel. This significantly simplifies the construction of the hinge by minimizing the number of independent component parts of the hinge, as well as to help to maintain the overall hinge 10 in a highly compact configuration, and to help minimize the overall weight of the hinge.

It will also be appreciated that two or more of the SMA wires 22 may be used. In this instance the bores 12a and 14a will need to be sized accordingly. Still further, two or more SMA wires 22 of different diameters could be included. If two or more SMA wires are used, they may all include bent ends such as end 22a shown in FIGS. 1 and 2, and they may all be captured in a single blind or through hole, or they may be captured in separate blind or through holes.

The hinge portions 12 and 14 may be formed from a material which is suitable for the structural frame portion 16 and the frame portion 18 of the solar panel 20. In one implementation the frame portions 16 and 18 are formed from aluminum, although other materials may be used just as well, and the hinge 10 is not limited to use with any specific frame materials, although preferable the materials used for the frame portions 16 and 18 are highly structurally rigid.

FIG. 1 also illustrate a simple pliers or vise-style gripping tool 26 being used to grip a second (i.e., free) end 22c of the SMA wire 22 to apply a torsional pre-load force to the SMA wire. One of the movable or fixed hinge portions 12 or 14, or the frame portion 18 of the solar panel 20 or the frame portion 16 of the spacecraft, may incorporate a mechanism for locking the SMA wire 22 in a pre-loaded angular orientation. In one embodiment the mechanism may be formed by one or more threaded set screws 24 (e.g., Allen-style set screws) which extend through threaded holes 28 in either of the frame sections 16 or 18, or possibly in either of the hinge portions 12 or 14, to engage the free end 22c of the SMA wire 22 and lock it angularly in place with a desired amount of torsional pre-load. FIG. 1 shows one example with the threaded set screws 24 extending through the frame portion 18 of the solar panel 20. Optionally, it is possible that instead of gripping the free end 22c of the SMA wire 22 as shown in FIG. 1, the free end could possibly include a bent portion such as is shown for end 22a, which is bent so as to be angularly offset from the bend imparted to the end 22a. This configuration could be used as long as more than one element (i.e., tool) is applied to control the bending, and the connection to the other panel is mirrored. This "dual bend" configuration for the SMA wire 22 provides the advantage of not requiring any set screws or epoxy to maintain the torsional pre-load force on the SMA wire, but provides less flexibility in adjusting the torsional force than the use of set screws provides. In either event, the pre-load force applied by the SMA wire 22 should be sufficient to deploy the solar panel 20 and hold it rigidly in its fully deployed orientation. Optionally, the SMA wire 22 could incorporate a flat section at its free end 22c, which further helps to ensure against angular slippage of the SMA wire 22 once the pre-load force is applied to it.

Optionally, a suitable fixture may also be formed to hold the solar panel 20 in a folded (i.e., non-deployed) orientation while the SMA wire 22 is being pre-loaded and mounted to the frame portions 16 and 18. While not absolutely essential to practicing the invention, a suitable fixture may increase the ease and convenience of applying the needed pre-load force to the hinge 10 during assembly operations.

Figure 3:
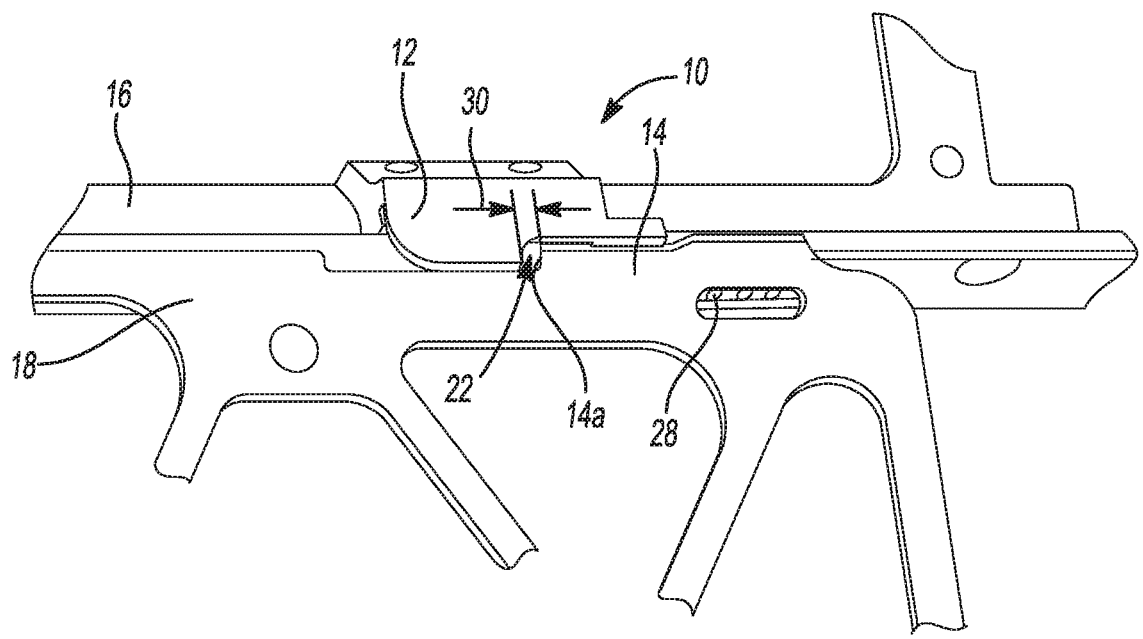
FIG. 3 is a perspective view of the opposite side of the hinge from that shown in FIG. 1.

Referring to FIG. 3, in a spacecraft and solar panel 20 implementation as described herein, it is also highly desirable to include a gap 30 between facing edges of the fixed hinge portion 12 and the movable hinge portion 14 of the hinge 10. In one preferred implementation the gap is about 1.5 mm. This ensures that no cold welding or galling will occur between the facing surfaces of the hinge portions 12 and 14, which could otherwise be an issue in space applications.

Figure 4:
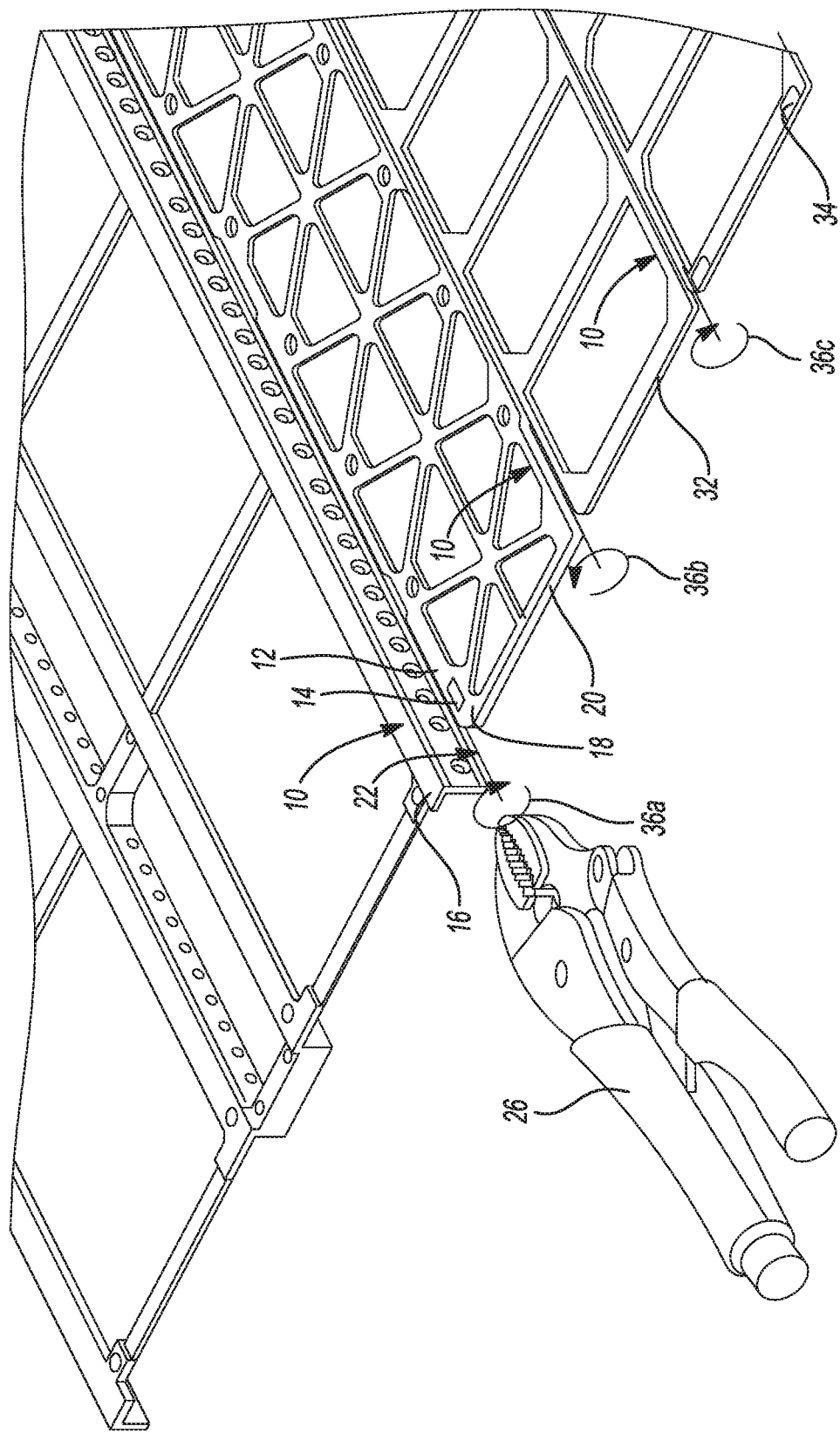
FIG. 4 is a perspective view of multiple ones of the hinges being used to support a plurality of solar panels for folding deployment, and also indicating the angular direction of the pre-load force that needs to be applied on the hinges of the different solar panels for deployment.

Referring to FIG. 4, in a space application where multiple linked solar panel sections 20, 32 and 34 are used, the angular direction of the needed pre-loading torsional force is shown by arrows 36a, 36b and 36c.

Figure 5:
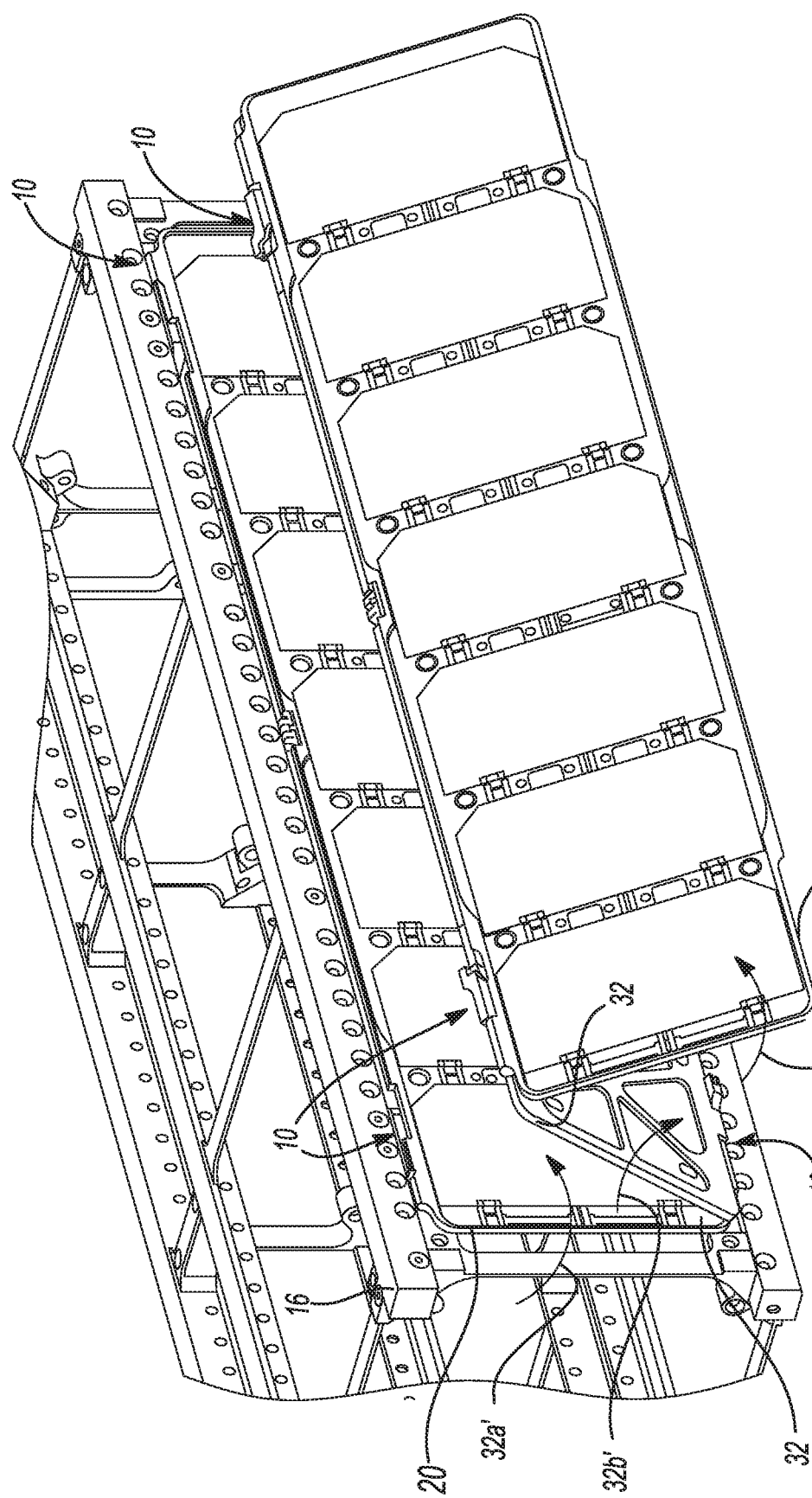
FIG. 5 shows the inter-coupled solar panels of FIG. 4 in a partially deployed orientation.
Figure 6:
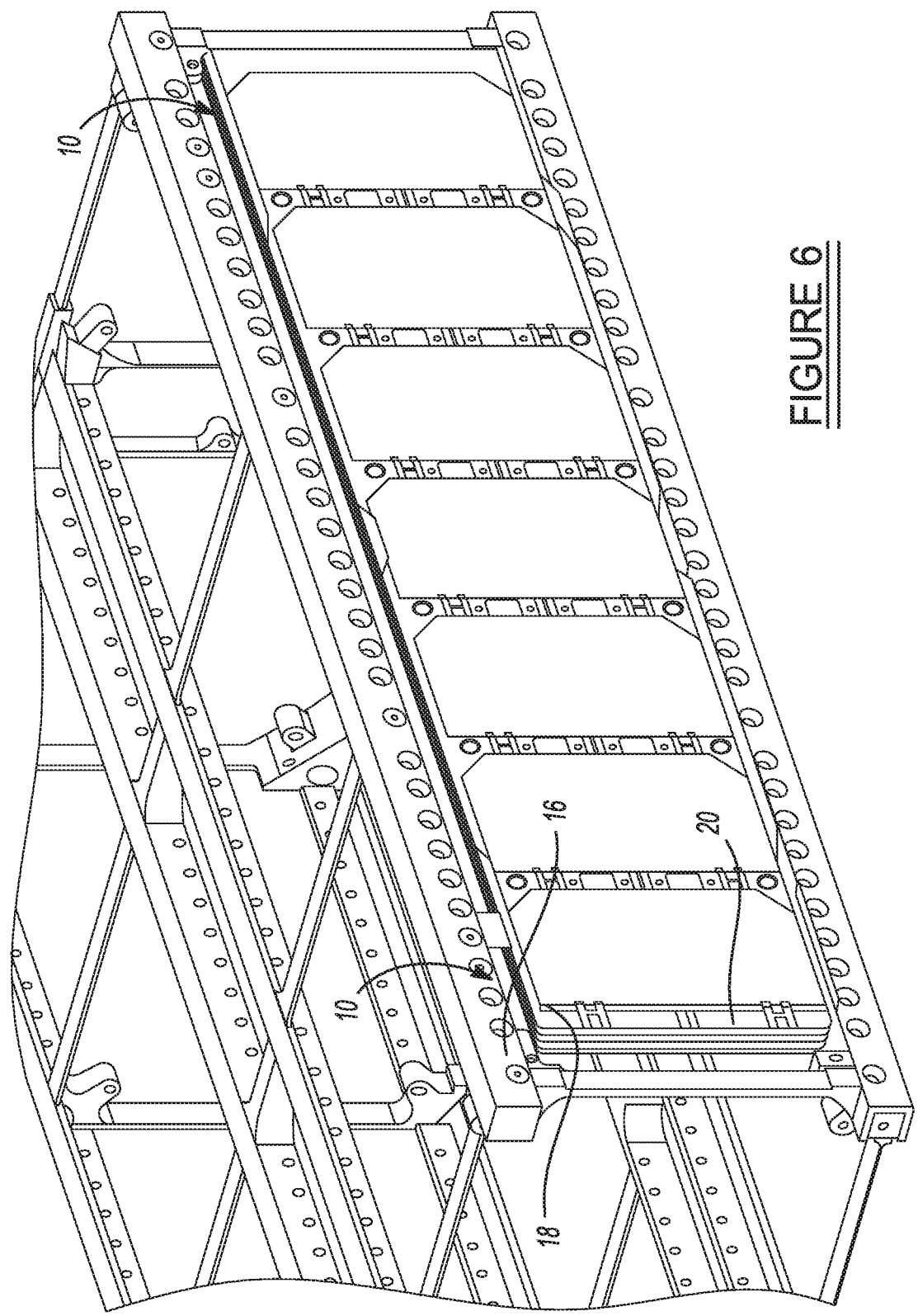
FIG. 6 shows the inter-coupled solar panels of FIG. 4 in a fully folded (i.e., retracted) orientation.

FIG. 5 shows the solar panels 20, 32 and 34 in a partially deployed orientation. The angular pre-loading directions 32a, 32b and 32c enable the solar panels 20, 32 and 34 to be deployed with counter-clockwise 32a', clockwise 32b' and counter-clockwise 32c' motions, respectively. The three solar panels 20, 32 and 34 are shown their highly compact, fully folded (non-deployed) orientation in FIG. 6.

While the hinge 10 has been described for use with a solar panel, it will be appreciated that any element that needs to be deployed from a folded or retracted orientation may potentially be deployable using the hinge 10. For example, other components that may be useable with the hinge 10 may include, without limitation, antennas, circuit boards, sensors, lights, or any other electronic or optical subsystems.

The hinge 10 of the present disclosure thus works by combining the "hinge" mechanism itself with an effective energy storage system (the SMA wire 22). The SMA wire 22 stores mechanical energy in torsion and also serves as the link between the rigid panels. The approach of using a SMA single 22 wire removes essentially all friction a standard pin hinge system would experience, and thus eliminates typical problematic issues with cold welding or galling when used in space. The SMA wire 22 is generally of a small diameter, which allows the thickness of each hinge portion 12 and 14 to stay within about 2 mm, and allows combining two or more deployable solar panel sections within the same volume.

For small satellite applications, three hinge 10 sections can be folded within a 6.5 mm allowable volume outside the bus rails of the solar panel 20. The amount of stored energy can be easily adjusted during assembly by controlling the amount of torsion of the SMA wire 22. A traditional biasing system generally require replacing the energy storage system (spring or power based) to provide more energy. The hinge 10 with its SMA wire 22 allows finer control of the remaining amount of stored energy in the hinge 10 after deployment of each of the solar panels 20, 32 and 34, and further allows adjustment of the stiffness of the final deployed structure.

Furthermore, the invention may be used in various applications. For example, a novel small satellite solar panel design approach maintaining low profile when stowed, can be formed using the hinge 10 of the present disclosure. The low profile of the solar panel 20 allows developing high surface area deploying panels while staying outside of the main volume of the spacecraft. The friction-less quality of the hinge 10 provides significantly improved reliability in space by dramatically reducing the chance of cold welding or galling.

Additional possible applications of the hinge 10 may involve aircraft applications for controlling landing gear, wing flaps or other aircraft components or subsystems that require movement between two or more positions. The hinge 10 may be configured to apply a retracting force, for example to retract landing gear of an aircraft, at a desired time after takeoff. As such, the hinge 10 can be used in both applications requiring an opening or deploying motion of a component or subsystem, as well as a retracting motion of the component or subsystem. Whether a component is to be deployed or retracted will determine the direction of the torsional pre-loading force applied to the SMA wire 20.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A reduced friction torsion component hinge system, comprising:
    a first frame portion adapted to be coupled to, or integrally formed with, a first object, and forming a first bore;
    a second frame portion adapted to be coupled to, or integrally formed with, a second object, and forming a second bore, with the second bore being axially aligned with the first bore;
    at least one hinge component having first and second ends, the hinge component extending through the first and second bores for both coupling the first and second frame portions together for pivoting movement relative to one another, and for providing a torsional biasing force to enable pivotal deployment from a first position to a second position of one of the first or second frame portions; and
    wherein the hinge component includes a mechanism associated with one of the first or second ends, and also with one of the first or second frame portions, configured to secure one of the first or second ends in an angularly pre-loaded orientation.

2. The system of claim 1, wherein the hinge component comprises an elongated shape memory alloy element.

3. The system of claim 1, wherein the hinge component comprises a shape memory alloy wire.

4. The system of claim 3, wherein the shape memory alloy wire comprises a nickel-titanium wire.

5. The system of claim 1, wherein the hinge component forms an elongated hinge component.

6. The system of claim 5, wherein the mechanism includes a set screw for engaging one of the first or second ends of the elongated hinge component, and a threaded bore included in one of the first or second frame portions for receiving the set screw.

7. The system of claim 5, wherein the mechanism includes a plurality of set screws and a corresponding plurality of threaded bores included in one of the first or second frame portions for receiving the set screws.

8. The system of claim 5, wherein the first end of the hinge component comprises a bent end which is non-parallel to a remainder of the elongated hinge component, and which is configured to engage a portion of one or the other of the first or second objects to help generate the torsional biasing force.

9. The system of claim 1, wherein the hinge component comprises a shape memory alloy wire having a round cross-sectional shape.

10. The system of claim 9, wherein the shape memory alloy wire comprises of diameter of between 0.010 inch and 0.050 inch.

11. The system of claim 10, wherein the shape memory alloy wire has a diameter of 0.020 inch.

12. A reduced friction, low profile torsion wire hinge system, comprising:
   a first frame portion adapted to be coupled to, or integrally formed with, a first object, and forming a first bore;
   a second frame portion adapted to be coupled to, or integrally formed with, a second object, and forming a second bore, with the second bore being axially aligned with the first bore; and
   at least one elongated wire extending through the first and second bores for both coupling the first and second frame portions together for pivoting movement relative to one another, and for providing a torsional biasing force to enable pivotal deployment from a first position to a second position of one of the first or second frame portions; and
   a mechanism for securing the elongated wire in a torsionally pre-loaded condition, such that one of the first or second frame portions is biased at least one of towards or away from the other.

13. The hinge system of claim 12, wherein the elongated wire comprises a shape memory alloy wire comprised of nickel-titanium wire.

14. The hinge system of claim 13, wherein the shape memory alloy wire comprises a diameter of between 0.010 inch and 0.050 inch.

15. The hinge system of claim 14, wherein the shape memory alloy wire comprises a diameter of 0.020 inch.

16. The hinge system of claim 12, wherein a first end of the elongated wire is bent to engage with a portion of the first object.

17. The hinge system of claim 12, wherein a first end of the elongated wire is bent at a 90 degree angle relative to a remainder of the elongated wire to engage with a portion of the first object.

18. The hinge system of claim 12, wherein the mechanism includes a set screw and a threaded hole associated with one of the frame portions, the elongated wire being configured to engage a first one of the first or second objects portions at a first end thereof, and the set screw being configured to engage a second end of the elongated wire, while being held in the torsionally pre-loaded condition.

19. A method for forming a reduced friction torsion wire hinge, the method comprising:
   providing a first frame portion adapted to be coupled to, or integrally formed with, a first object, and forming a first bore;
   providing a second frame portion adapted to be coupled to, or integrally formed with, a second object, and forming a second bore, with the second bore being axially aligned with the first bore; and
   inserting at least one elongated hinge component through the first and second bores to couple the first and second frame portions together for pivoting movement relative to one another, and further such that a first end of the hinge component engages with the first object;
   applying a torsional pre-load force to the second end of the elongated hinge component; and
   while applying the pre-load force to the second end of the hinge component, using a mechanism configured to restrain the second end in a pre-loaded angular orientation relative to the second object, such that the elongated hinge component biases the first and second frame portions, and thus the first and second objects, for rotational motion either toward one another or away from one another.

20. The method of claim 19, wherein the inserting at least one elongated hinge component comprises inserting at least one elongated shape memory alloy element through the first and second bores.

21. A reduced friction torsion component hinge system, comprising:
   a first frame portion adapted to be coupled to, or integrally formed with, a first object, and forming a first bore;
   a second frame portion adapted to be coupled to, or integrally formed with, a second object, and forming a second bore, with the second bore being axially aligned with the first bore;
   at least one hinge component having first and second ends, the hinge component extending through the first and second bores for both coupling the first and second frame portions together for pivoting movement relative to one another, and for providing a torsional biasing force to enable pivotal deployment from a first position to a second position of one of the first or second frame portions;
   the first end of the hinge component configured to engage a blind hole portion of one of the first or second objects; and
   the second end of the hinge component including one of:
      a mechanism associated with the other one of the first or second objects, for securing the hinge component in an angularly pre-loaded orientation; or
      a bent end angularly offset from the bent end, and associated with the other one of the first or second objects, for securing the hinge component in an angularly pre-loaded orientation; or
      an adhesive associated with the other one of first or second objects, for securing the hinge component in an angularly pre-loaded orientation.

* * * * *